US009413970B2

(12) United States Patent
Fujita et al.

(10) Patent No.: US 9,413,970 B2
(45) Date of Patent: Aug. 9, 2016

(54) CAMERA AND METHOD OF CONTROLLING OPERATION OF SAME

(71) Applicant: FUJIFILM Corporation, Tokyo (JP)

(72) Inventors: Koudai Fujita, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/582,940

(22) Filed: Dec. 24, 2014

(65) Prior Publication Data

US 2015/0109467 A1    Apr. 23, 2015

Related U.S. Application Data

(63) Continuation of application No. PCT/JP2013/064348, filed on May 23, 2013.

(30) Foreign Application Priority Data

Jun. 29, 2012   (JP) .................. 2012-146944

(51) Int. Cl.
*H04N 5/232* (2006.01)
*H04N 5/369* (2011.01)
(Continued)

(52) U.S. Cl.
CPC ............ *H04N 5/23293* (2013.01); *G03B 13/06* (2013.01); *G03B 13/10* (2013.01); *G03B 17/20* (2013.01); *H04N 5/225* (2013.01);
(Continued)

(58) Field of Classification Search
CPC .................................................. H04N 5/23293

USPC ........................................................ 348/222.1
See application file for complete search history.

(56) References Cited

U.S. PATENT DOCUMENTS 7,668,456 B2 *   2/2010   Ueda et al. .................... 396/380
8,670,061 B2 *   3/2014   Sakurabu ................. 348/333.08
(Continued)

FOREIGN PATENT DOCUMENTS

JP      6-22185 A      1/1994
JP   2000-184269 A    6/2000
(Continued)

OTHER PUBLICATIONS

International Search Report for PCT/JP2013/064348 mailed on Jul. 2, 2013.
(Continued)

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

It is arranged so that a camera user can recognize presence of camera shake in a case where the user is looking at a subject through an optical viewfinder. A portion of the image of a subject captured by a solid-state electronic image sensing device is displayed in an electronic viewfinder constituted by a liquid crystal display unit. An image of a subject optically formed via an objective window of the optical viewfinder and the portion of the image of the subject displayed in the electronic viewfinder are superimposed. If camera shake is taking place, the portion of the image of the subject in the superimposed images will appear blurry. By viewing this portion of the image of the subject, therefore, the user can tell whether camera shake is taking place.

4 Claims, 14 Drawing Sheets

(51) Int. Cl.
*G03B 13/10* (2006.01)
*G03B 13/06* (2006.01)
*G03B 17/20* (2006.01)
*H04N 5/225* (2006.01)

(52) U.S. Cl.
CPC .......... *H04N 5/232* (2013.01); *H04N 5/23248* (2013.01); *H04N 5/23264* (2013.01); *H04N 5/369* (2013.01)

(56) References Cited

U.S. PATENT DOCUMENTS

2010/0103305 A1* 4/2010 Suda et al. ............... 348/333.02

2014/0211050 A1 7/2014 Nakamaru

FOREIGN PATENT DOCUMENTS

| | | |
|---|---|---|
| JP | 2008-244511 A | 10/2008 |
| JP | 2012-65294 A | 3/2012 |
| JP | 2012-99984 A | 5/2012 |
| WO | WO 2012/120952 A1 | 9/2012 |
| WO | WO 2013/047482 A1 | 4/2013 |

OTHER PUBLICATIONS

Written Opinion of the International Searching Authority for PCT/JP2013/064348 mailed on Jul. 2, 2013.

* cited by examiner

CAMERA AND METHOD OF CONTROLLING OPERATION OF SAME

CROSS-REFERENCE TO RELATES APPLICATIONS

This application is a Continuation of PCT International Application No. PCT JP2013/064348 filed on May 23, 2013, which claims priority under 35 U.S.C. §119(a) to Japanese Patent Application No. 2012-146944 filed Jun. 29, 2012. Each of the above application is hereby expressly incorporated by reference, in its entirety, into the present application.

BACKGROUND OF THE INVENTION

1. Field of the Invention

This invention relates to a camera and to a method of controlling the operation thereof.

2. Description of the Related Art

There are instances where a camera is formed to include an optical viewfinder having an objective window facing the subject and an eyepiece window looked at by the user. The user decides the angle of view and takes a picture while looking at the optical viewfinder of the camera.

A finder unit implemented in the art makes it possible to display such information as a visual-field frame, which is displayed on the display screen of a liquid crystal display unit, by superimposing this information upon the optical image of a subject that can be seen by using an optical viewfinder (Patent Document 1). There is also a camera in which the image of a subject obtained from an optical viewfinder and the image of a subject obtained from a solid-state electronic image sensing device are displayed in separate areas within a finder (Patent Document 2).

Patent Document 1: Japanese Patent Application Laid-Open No. 2012-65294

Patent Document 2: Japanese Patent Application Laid-Open No. 2008-244511

When a camera is being shaken, the image of the subject captured by imaging will be blurred by such shaking motion. Nevertheless, there are instances where the user cannot tell that the captured image of the subject is blurred due to shaking merely by looking at the subject through the optical viewfinder. Consequently, even though the subject being viewed by the user may not be blurred, the image of the subject captured will be blurred. In Patent Documents 1 and 2 as well, the user cannot tell that the image of a subject affected by camera shake is in such a condition.

SUMMARY OF THE INVENTION

An object of the present invention is to arrange it so that even if a user is looking at a subject through an optical viewfinder, the user can ascertain the condition of the image of the subject that will be captured when the camera sustains camera shake.

According to the present invention, there is provided a camera comprising: an optical viewfinder formed on the front of the camera and having an objective window facing a subject and an eyepiece window for looking at the subject seen through the objective window; a solid-state electronic image sensing device for imaging the subject and outputting image data representing the image of the subject; a display unit for displaying a portion of the image of the subject, which is represented by the image data that has been output from the solid-state electronic image sensing device, on a display screen; and a deflecting unit for introducing the portion of the image of the subject, which is being displayed on the display screen of the display unit, to the eyepiece window so as to be superimposed upon the subject seen through the eyepiece window.

The present invention also provides an operation control method suited to the above-described camera. Specifically, the present invention provides a method of controlling operation of a camera which includes an optical viewfinder formed on the front of the camera and having an objective window facing a subject and an eyepiece window for looking at the subject seen through the objective window, the method comprising steps of: a solid-state electronic image sensing device imaging the subject and outputting image data representing the image of the subject; a display unit displaying a portion of the image of the subject, which is represented by the image data that has been output from the solid-state electronic image sensing device, on a display screen; and a deflecting unit introducing the portion of the image of the subject, which is being displayed on the display screen of the display unit, to the eyepiece window so as to be superimposed upon the subject seen through the eyepiece window.

In accordance with the present invention, a portion of the image of a subject captured by a solid-state electronic image sensing device is displayed on the display screen of a display unit. A portion of the displayed image of the subject is introduced to the eyepiece window of an optical viewfinder so as to be superimposed upon the optical image of the subject seen through the eyepiece window. Since the portion of the image of the subject captured by the solid-state electronic image sensing device is superimposed upon the optical image of the subject seen through the eyepiece window of the optical viewfinder, the user, by observing the superimposed state, can tell whether the captured image of the subject is blurry due to camera shake. Further, since what is superimposed on the optical image of the subject seen through the eyepiece window of the optical viewfinder is a portion of the captured image of the subject, the user can check the subject based upon the remaining portion of the image of the subject and can decide the angle of view.

The apparatus may further comprise a camera-shake detection device (camera-shake detection means) for detecting shaking of the camera; and a camera-shake notification device (camera-shake notification means) for notifying of camera shake in response to the fact that camera shake has been detected by the camera-shake detection device.

By way of example, the camera-shake notification device notifies of camera shake by displaying, on the display screen of the display unit, a character string to the effect that camera shake is taking place or an image representing the fact that camera shake is taking place, or by changing the form of a border, which encloses a portion of the image of the subject, in accordance with whether or not camera shake is taking place.

In a case where a principal subject seen through the optical viewfinder and a principal subject image among subject images captured in the solid-state electronic image sensing device are displayed on the display screen of the display unit, the display unit may display a portion of the subject image on the display screen upon applying a parallax correction in such a manner that the principal subject image and the principal subject will coincide.

If the distance from the camera to the principal subject is equal to or greater than a predetermined distance, the display unit may, in a case where a principal subject seen through the optical viewfinder and a principal subject image among subject images captured in the solid-state electronic image sensing device are displayed on the display screen of the display unit, display a portion of the subject image on the display screen in such a manner that the principal subject image and the principal subject will coincide.

The apparatus may further comprise a recording control device (recording control means) for recording image data, which has been output from the solid-state electronic image sensing device, on a recording medium.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
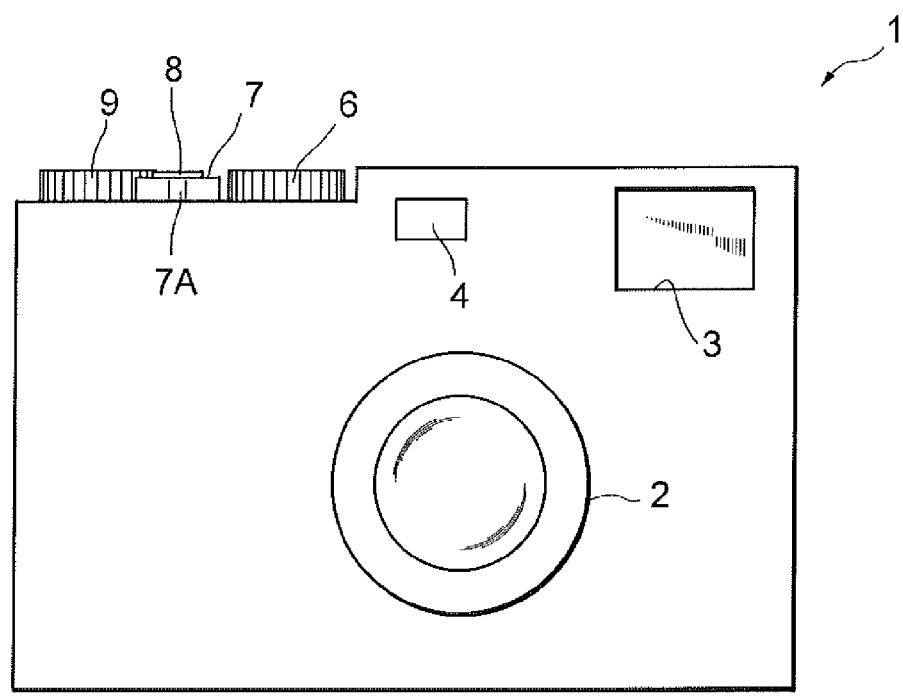
FIG. 1 is a front view of a digital camera.
Figure 2:
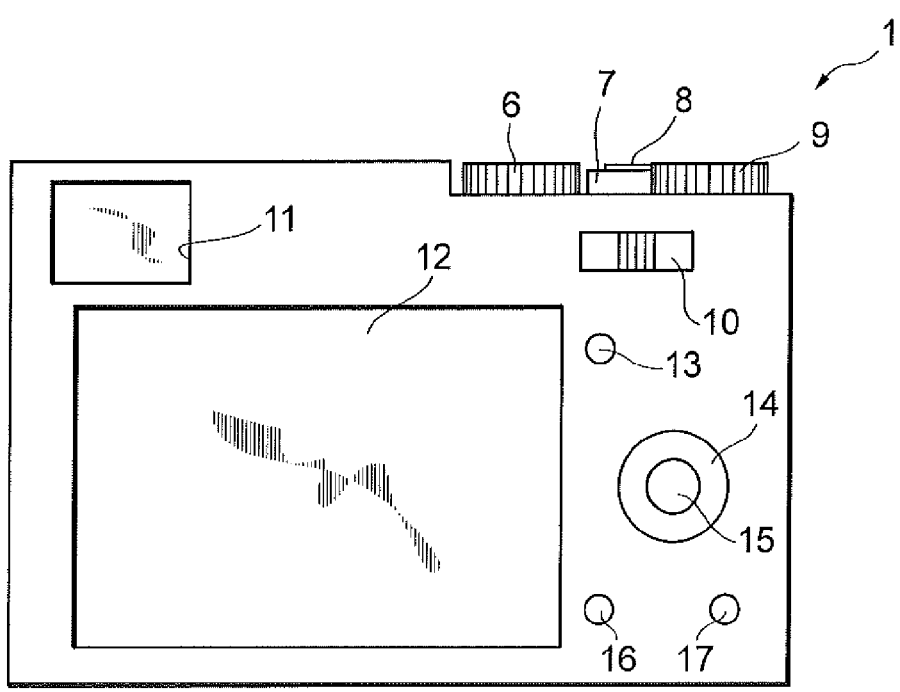
FIG. 2 is a back view of the digital camera.
Figure 3:
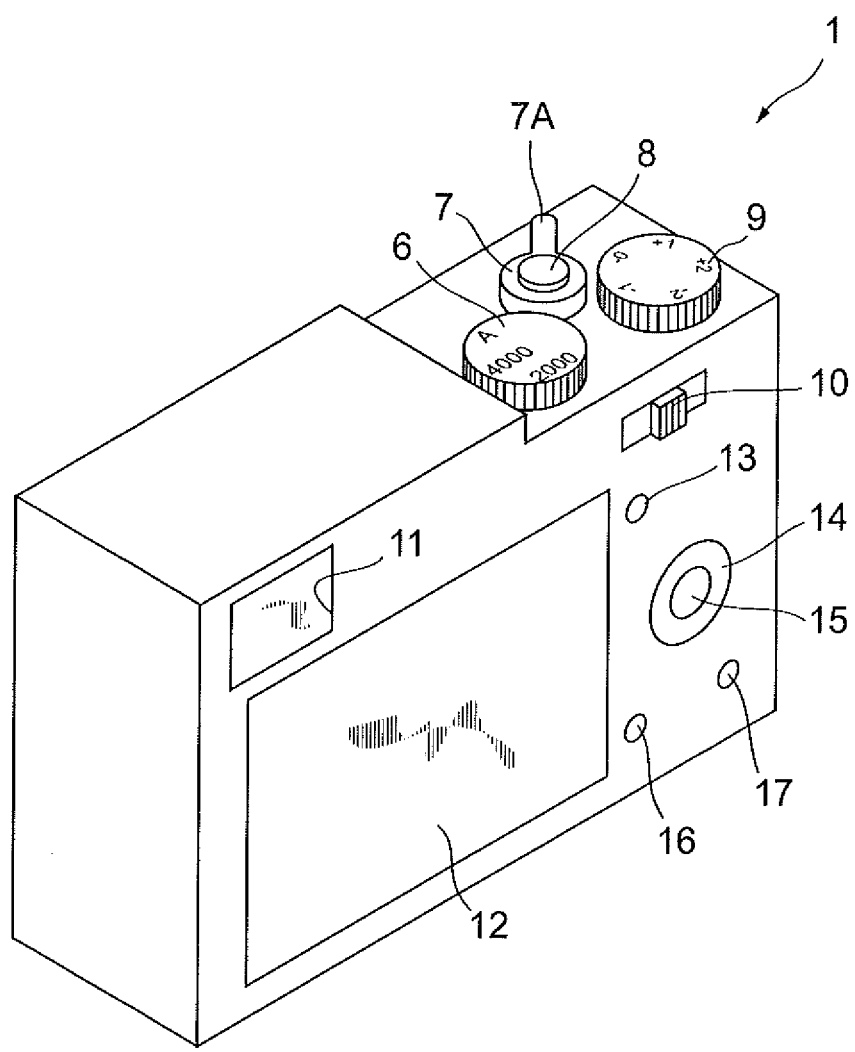
FIG. 3 is a perspective view of the digital camera when viewed from the back.

FIGS. 1 to 3, which illustrate an embodiment of the present invention, show the external appearance of a digital camera 1. FIG. 1 is a front view, FIG. 2 a back view and FIG. 3 a perspective view when viewed from the back.

With reference to FIG. 1, a lens barrel 2 projects forwardly from the approximate center of the front side of the digital camera 1. An optical viewfinder is constructed at the upper right of the digital camera 1 and is formed to include an objective window 3 facing a subject. A flash device 4 is provided on the left side of the objective window 3.

A shutter-speed dial 6, a power lever 7, a shutter-release button 8 and an exposure dial 9 are provided on the top of the digital camera 1 on the left side thereof when viewed from the front. The shutter-speed dial 6 is a circular dial that is free to rotate. By rotating the shutter-speed dial 6, the user can set a desired shutter speed. The power lever 7 can be moved through a prescribed angle rightward and leftward as seen from the front. By moving the power lever 7 through the prescribed angle, the user can turn the power supply of the digital camera 1 on and off. The power lever 7 has the shape of a ring with an interior space when viewed from the top (see FIG. 3), and the shutter-release button 8 is provided within the space. The exposure dial 9 also is a circular dial that is free to rotate. By turning the exposure dial 9, the user can correct the exposure.

With reference to FIGS. 2 and 3, a liquid crystal display device 12 is provided on the back side of the digital camera 1 substantially over the entirety thereof. An eyepiece window 11 constituting the above-mentioned optical viewfinder is formed on the back side of the digital camera 1 at the upper left thereof. A command lever 10 movable to the left and right is provided on the back side of the digital camera 1 at the upper right thereof. By manipulating the command lever 10, the user can supply the digital camera 1 with a command such as an aperture adjustment command in steps of ⅓ EV when the camera is in the manual exposure mode.

Provided below the command lever 10 are an AF (autofocus)/AB (autoexposure) lock button 13, a command dial 14, a menu/OK button 15, a back button 16 and a RAW button 17, etc.

With reference primarily to FIG. 3, the shutter-speed dial 6, power lever 7, shutter-release button 8 and exposure dial 9 are provided on the top of the digital camera 1 on the right side thereof (the right side when viewed from the back), as mentioned above. The power lever 7 is formed to have a projection 7A projecting toward the front side. The power supply of the digital camera 1 can be turned on and off by grasping the projection 7A and moving it to the right or left.

By bringing an eye close to the eyepiece window 11 of the optical viewfinder and looking at the eyepiece window 11, the user can view a subject through the objective window 3 and eyepiece window 11 and can decide the camera angle.

Figure 4:
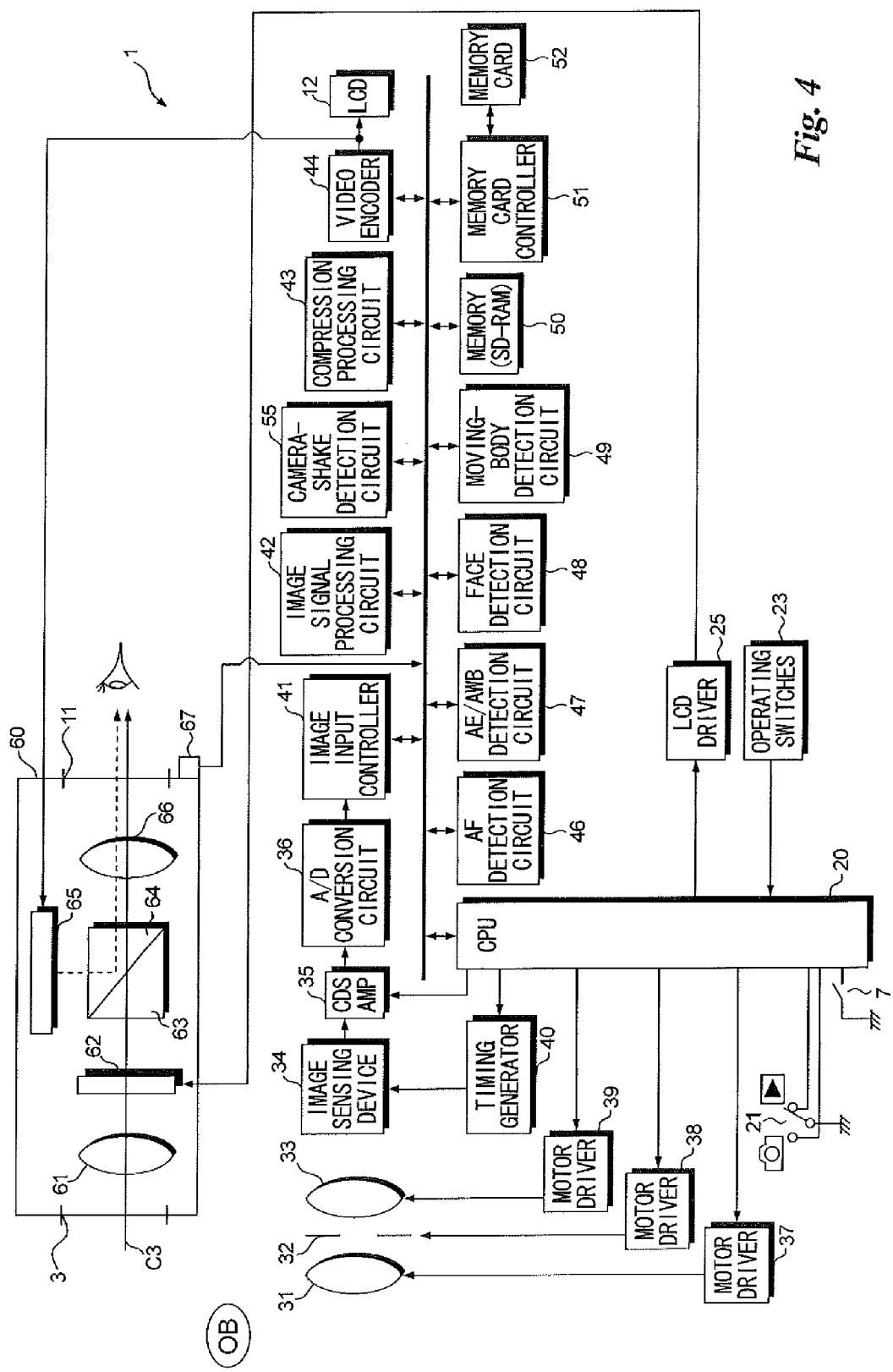
FIG. 4 is a block diagram illustrating the electrical configuration of the digital camera.

FIG. 4 is a block diagram illustrating the electrical configuration of the digital camera 1.

The overall operation of the digital camera 1 is controlled by a CPU 20.

As mentioned above, the digital camera 1 is provided with operating switches 23 such as the shutter-speed dial 6, power lever 7 and exposure dial 9. Signals from the operating switches 23 are input to the CPU 20. Further, a signal indicating whether the power supply has been turned on or off by the power lever 7 also is input to the CPU 20. A changeover signal from a changeover switch 21 for switching between a shooting mode and a playback mode also is input to the CPU 20.

The digital camera 1 includes a solid-state electronic image sensing device 34. A zoom lens 31, iris 32 and focusing lens 33 are provided in front of the solid-state electronic image sensing device 34. The zoom lens 31 has its amount of zoom controlled by a motor driver 37, the iris 32 has its aperture value controlled by a motor driver 38, and the focusing lens 33 has its focus position controlled by a motor driver 39.

When the image of a subject is formed on the photoreceptor surface of the solid-state electronic image sensing device 34, the solid-state electronic image sensing device 34 is controlled by a timing generator 40 and a video signal representing the image of the subject is output from the solid-state electronic image sensing device 34. The video signal that has been output from the solid-state electronic image sensing device 34 is subjected to correlated double sampling in a CDS (Correlated Double Sampling) amplifier circuit 35. The CDS amplifier circuit 35 outputs the resultant video signal, which is converted to digital image data in an analog/digital conversion circuit 36.

The digital image data is input to an AF (autofocus) detection circuit 46 via an image input controller 41. A focusing control signal is generated based upon the entered digital image data, and the focusing control signal generated is input to the CPU 20. The motor driver 39 is controlled based upon the focusing control signal so that the focusing lens 33 is positioned. The AF detection circuit 46 also calculates the distance to a principal subject specified by a AF target frame 94, described later. If necessary, the digital camera 1 would be provided with a rangefinding device for measuring the distance to the principal subject. Further, the digital image data that has been output from the image input controller 41 is input to an AE (autoexposure)/AWB (automatic white balance) 47 as well. The AE/AWB detection circuit 47 generates an exposure control signal and a white balance adjustment signal. The exposure control signal generated is input to the CPU 20. The motor driver 38 is controlled based upon the exposure control signal, whereby the aperture value of the iris 32 is controlled. Further, the white balance adjustment signal generated in the AE/AWB detection circuit 47 is input to an image signal processing circuit 42. Image data that has been output from image input controller 41 also is input to the image signal processing circuit 42 as well. The image signal processing circuit 42 subjects the image data to a white balance adjustment based upon the white balance adjustment signal.

Image data that has been output from the image signal processing circuit 42 is applied to a liquid crystal display device 12 via a video encoder 44. The captured image of the subject is displayed on the display screen of the liquid crystal display device 12.

As mentioned above, the digital camera includes an optical viewfinder 60.

The optical viewfinder 60 has an eyepiece lens 66 provided in front of the eyepiece window 11. A prism 63 formed to have a half-mirror 64 is provided in front of the eyepiece lens 66. The half-mirror 64 is formed so as to have a 45-degree angle of incidence with respect to optical axis C3 of the optical viewfinder 60. An OVF (optical viewfinder) shutter (which may be a mechanical shutter or a liquid crystal shutter) 62 and an objective lens 61 are provided in front of the prism 63. The optical viewfinder 60 is further provided with an electronic viewfinder 65. Data representing various information and the like that are output from the video encoder 44 are input to the electronic viewfinder 65, where this information and the like are displayed. By inputting image data, which has been obtained by imaging, to the electronic viewfinder 65 when the OVF shutter 62 has closed, the image of the subject obtained by imaging is displayed on the display screen of the electronic viewfinder 65.

When the OVF shutter 62 is open, the image of a subject OB formed by the objective lens 61 and eyepiece lens 66 can be seen through the eyepiece window 11. Further, when various information is displayed on the display screen of the electronic viewfinder 65 when the OVF shutter 62 is open, light rays representing this information are reflected by the half-mirror 64 so that the user can see the information. Information and the like displayed on the display screen of the electronic viewfinder 65 can be seen upon being superimposed upon the optical image of the subject formed by the objective lens 61, etc.

In particular, according to this embodiment, a portion of the image of the subject captured by the solid-state electronic image sensing device 34 can be displayed in a portion of the electronic viewfinder 65 in a state in which the OVF shutter 62 is open. The portion of the image of the subject displayed in the electronic viewfinder 65 is superimposed upon the optical image of the subject seen through the objective window 3. If camera shake is non-existent, the portion in the electronic viewfinder and the optical image of the subject seen through the objective window 3 should not be offset from each other, but they will be offset if camera shake occurs. By observing the state of overlap, the user can tell whether camera shake is present or not.

An eye sensor 67 is mounted in the vicinity of the eyepiece window 11. The eye sensor 67 detects that the eye of user has been brought near the eyepiece window 11, whereupon the OVF shutter 62 opens so that the optical image of the subject OB can be viewed through the eyepiece window 11. If the eye sensor 67 has not detected that the eye of the user has been brought near the eyepiece window 11, the OVF shutter 62 closes. The image of the subject is displayed on the liquid crystal display device 12 and the user decides the camera angle while viewing the image of the subject being displayed on the liquid crystal display device 11. Even if the eye sensor 67 has detected that the eye of the user has been brought near the eyepiece window 11, the OVF shutter 62 can be turned off, image data representing the image of the subject can be input to the electronic viewfinder 65, and the image of the subject displayed in the electronic viewfinder 65 can be viewed through the eyepiece window 11.

The digital camera 1 further includes such circuits as a face detection circuit 48, a moving-body detection circuit 49 and a camera-shake detection circuit 55. The camera-shake detection circuit 55 is s circuit for detecting whether the digital camera 1 is experiencing camera shake.

When the shutter-release button 8 is pressed, image data that has been output from the image signal processing circuit 42 as described above is stored temporarily in a memory 50. The image data is read out of the memory 50 and is input to a compression processing circuit 43, which proceeds to execute prescribed compression processing. The compressed image data is applied to and stored temporarily in the memory 50. The compressed image data is read out of the memory 50 and is recorded on a memory card 52 by a memory card controller 51.

When the playback mode is set, image data that has been recorded on the memory card 52 is read out and the image represented by the read image data is displayed on the display screen of the liquid crystal display device 12.

Furthermore, image data representing information displayed in the electronic viewfinder 65 and data representing various information also have been stored in the memory 50. By reading out these items of data and applying them to the electronic viewfinder 65 via the video encoder 44, various information is displayed on the display screen of the electronic viewfinder 65.

Figure 5:
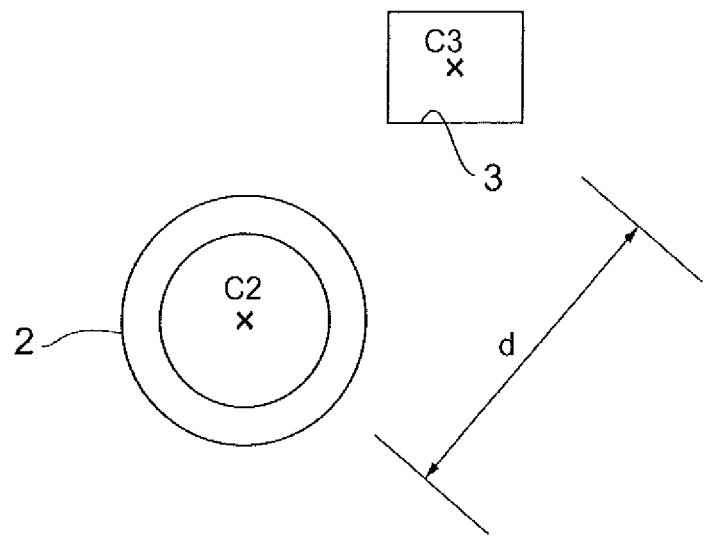
FIG. 5 illustrates the positional relationship between a lens barrel and an optical viewfinder.

FIG. 5 illustrates the relationship between the lens barrel 2 and the objective window 3 when the digital camera 1 is viewed from the front.

The lens barrel 2 has an optical axis C2. The optical axis C2 and the optical axis C3 of the optical viewfinder 60 (objective window 3) are a distance d apart and parallax exists between them. Consequently, there are instances where an offset develops between the optical image seen through the eyepiece window 11 and the image of the subject captured by the lens barrel 2. As described above, when a portion of the image of the subject captured by the solid-state electronic image sensing device 34 is displayed in the electronic viewfinder 65 and this is superimposed upon the optical image of the subject formed via the objective window 3, there are instances where, owing to the aforesaid parallax, the portion of the image of the subject displayed in the electronic viewfinder 65 and the optical image of the subject will not coincide even if camera shake is non-existent. In this embodiment, therefore, if camera shake is non-existent, then a parallax correction is applied as necessary in such a manner that the portion of the image of the subject displayed in the electronic viewfinder 65 and the optical image of the subject will coincide.

Figure 6:
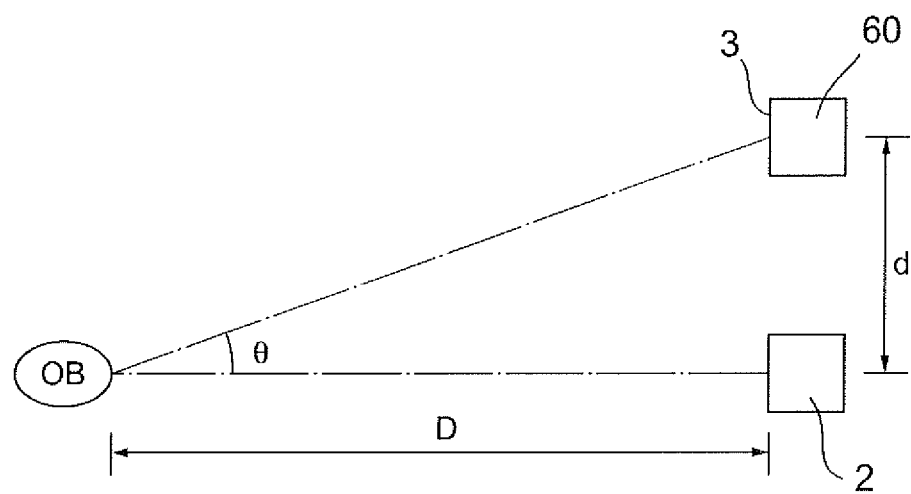
FIG. 6 illustrates a parallax angle between the lens barrel and the optical viewfinder.

FIG. 6 illustrates a case where principal subject OB is seen (imaged) via the lens barrel 2 and how the subject OB is seen through the eyepiece window 11 of the optical viewfinder 60.

As mentioned above, the distance between the optical axis C2 of the lens barrel 2 and the optical axis C3 of the eyepiece window 11 is d. Let D represent the distance from the lens barrel 2 to the principal subject OB. Accordingly, a parallax angle θ defined by a line from the lens barrel 2 to the object OB and a line from the eyepiece window 11 to the object OB is θ=arctan(d/D). That is, in a case where the principal subject OB is viewed through the lens barrel 2, the principal subject OB that appears in front can be seen from the eyepiece window 11 with an offset equivalent to the parallax angle θ.

Figure 7:
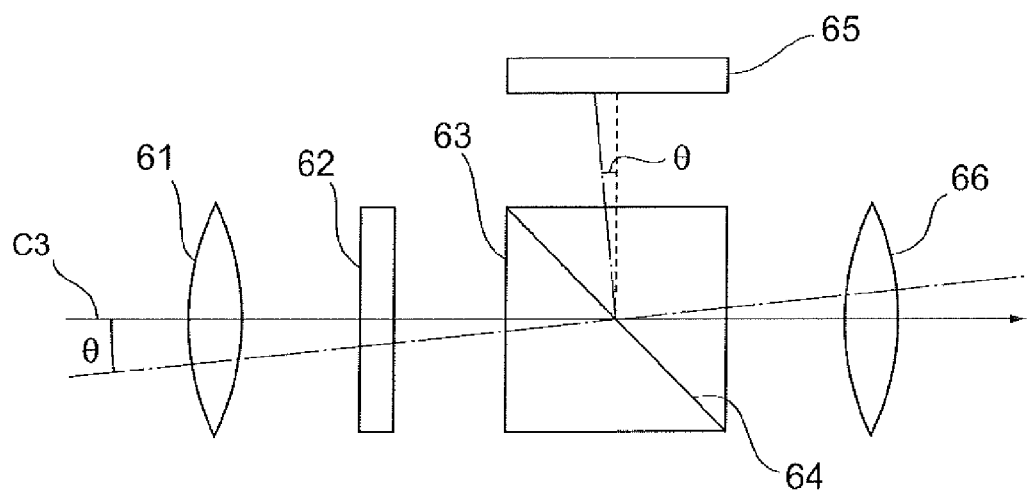
FIG. 7 illustrates the structure of an optical viewfinder.
Figure 7:
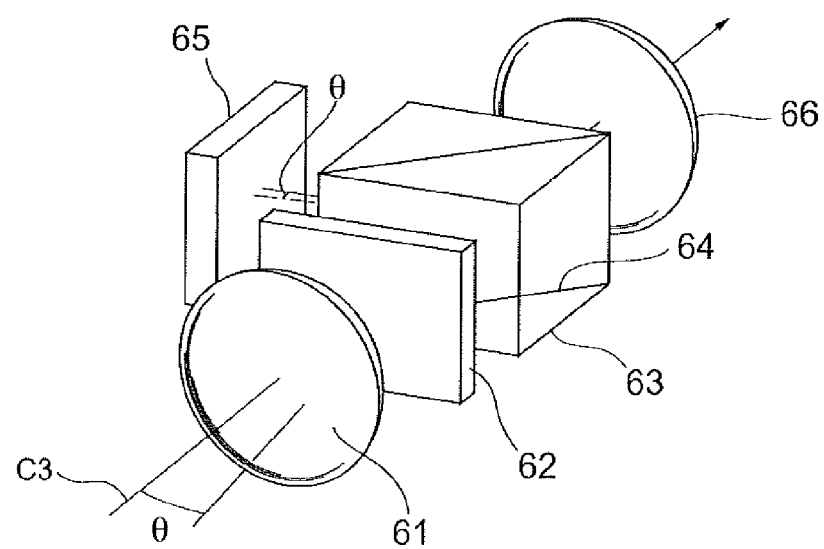

FIG. 7 illustrates the structure of the optical viewfinder 60. The diagram at the top of FIG. 7 illustrates the optical viewfinder 60 in a planar view in a manner similar to FIG. 4, and the diagram at the bottom of FIG. 7 illustrates the optical viewfinder 60 in three dimensions. Components FIG. 7 identical with those shown in FIG. 4 are designated by like reference characters.

As shown in FIG. 6, when the principal subject OB is viewed through the eyepiece window 11, it is offset from the optical axis of the optical viewfinder 60 by the parallax angle θ. Therefore, in order to make the portion of the image of the subject displayed in the electronic viewfinder 65 coincide with the optical image of the subject formed through the objective window 3, the portion of the image of the subject need only be displayed upon being offset by the parallax angle θ. It goes without saying that the direction in which the portion of the image of the subject is offset through the above-mentioned angle is decided in accordance with the positional relationship between the positions where the eyepiece window 11 and lens barrel 2 are placed and the position where the optical viewfinder 60 is placed.

Figure 8:
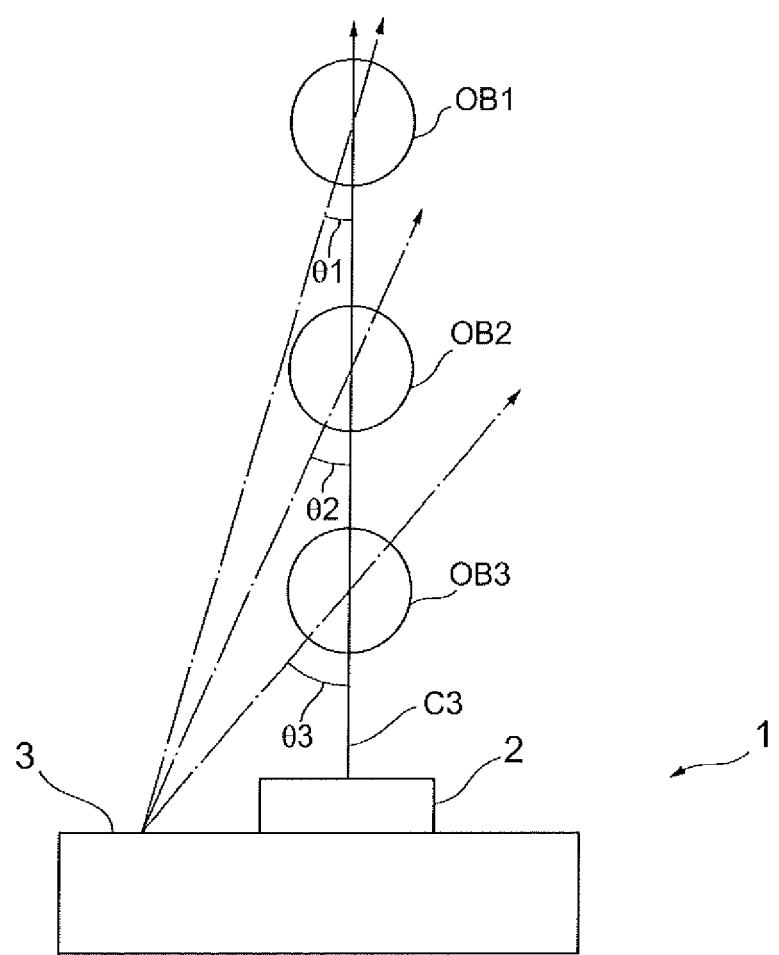
FIG. 8 illustrates the relationship between a digital camera and a principal subject.

FIG. 8 illustrates the positional relationship among the digital camera 1 and principal subjects OB1, OB2 and OB3 as viewed in a plane.

If the principal subject OB1 is at a position comparatively far from the digital camera 1, then a parallax angle formed with the optical axis of the objective window 3 will be θ1 in a case where the principal subject OB1 is viewed from the eyepiece window 11. Similarly, if the principal subject OB2 is at an intermediate position that is neither far from nor close to the digital camera 1, then a parallax angle formed with the optical axis of the objective window 3 will be θ2 in a case where the principal subject OB2 is viewed from the eyepiece window 11. Furthermore, if the principal subject OB3 is at a position close to the digital camera 1, then a parallax angle formed with the optical axis of the objective window 3 will be θ3 in a case where the principal subject OB3 is viewed from the eyepiece window 11. These parallax angles θ1, θ2 and θ3 are related as follows: θ1<θ2<θ3. Since the parallax angle will be small if the distance from the digital camera 1 is great, as is the case with the principal subject OB1, there will be almost no offset between the optical image of the subject seen through the objective window 3 and the portion of the image of the subject displayed in the electronic viewfinder 65, as mentioned above. This means that the above-mentioned parallax correction need not necessarily be applied in a case where the distance from the digital camera 1 is great, as is the case with the principal subject OB1.

Figure 9:
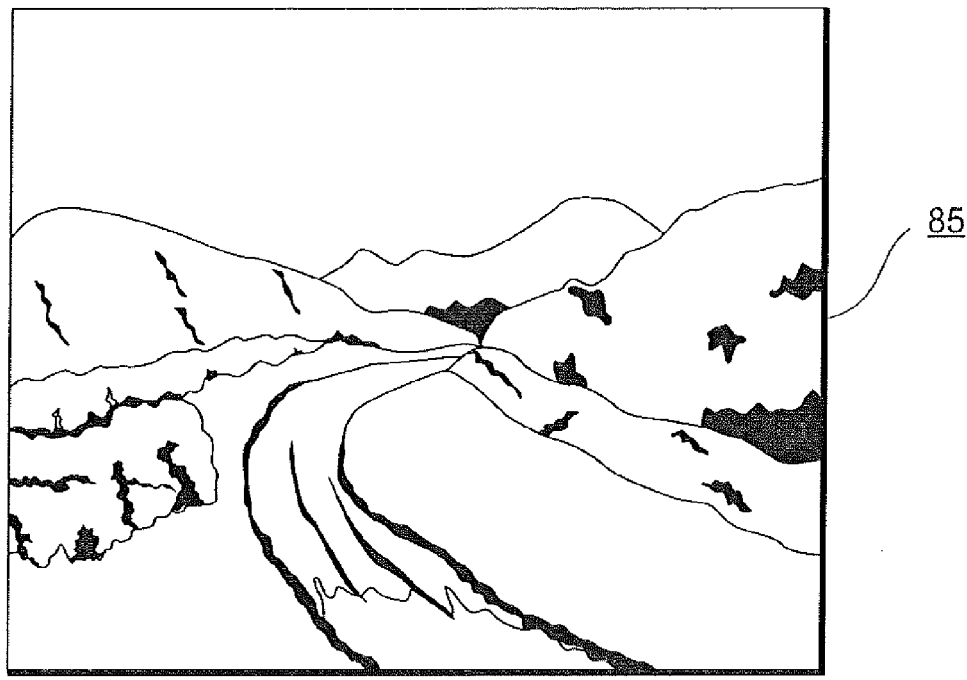
FIG. 9 shows an optical image of a subject and an image displayed in an electronic viewfinder.
Figure 9:
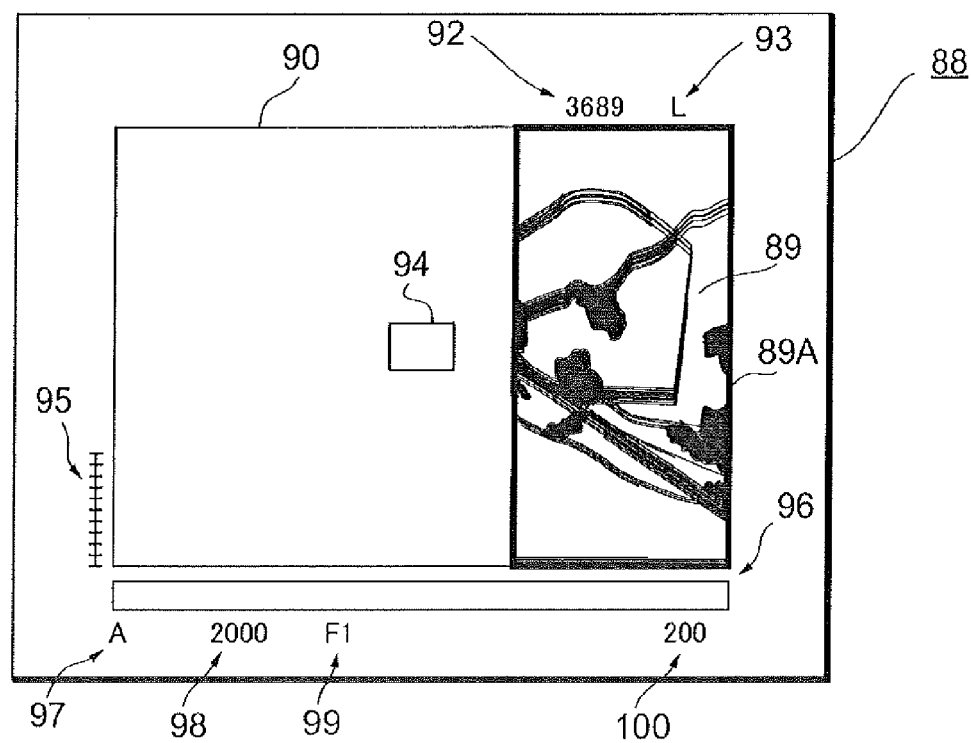

Shown at the top of FIG. 9 is an example of a subject image 85 formed optically through the objective window 3.

When the eye of the user is brought near the eyepiece window 11 and the OVF shutter 62 opens, the user sees the optical subject image 85 formed by the objective lens 61 and eyepiece lens 66.

Shown at the bottom of FIG. 9 is an example of an image 88 displayed in the electronic viewfinder 65.

When the eye of the user is brought near the eyepiece window 11 and this is sensed by the eye sensor 67, the image 88 shown at the bottom of FIG. 9 is displayed on the display screen of the electronic viewfinder 65.

A visual-field frame 90 indicating a picture-taking zone is formed on the image 88.

An area occupying about one-third of the visual-field frame 90 on the right side thereof is delimited as a confirmation display area 89. A portion of the image of the subject captured by the solid-state electronic image sensing device 34 in the manner described above is being displayed in the confirmation display area 89. In the example shown at the bottom of FIG. 9, the portion of the image of the subject captured by the solid-state electronic image sensing device 34 in a state in which camera shake is taking place is being displayed in the confirmation display area 89. The image within the confirmation display area 89, therefore, is blurry to due to camera shake. The image of the subject captured by the solid-state electronic image sensing device 34 is not being displayed within the visual-field frame 90 with the exception of the confirmation display area 89. The confirmation display area 89 is formed to have a border 89A so that the user can ascertain that this area is the confirmation display area 89.

Numerals 92 indicating the number of photos that can be taken and a character 93 indicating image size are being displayed at the upper right of the visual-field frame 90. Further, an AF target mark 94 is being displayed at the center of the visual-field frame 90. The subject specified by the AF target mark 94 is a principal subject. An exposure correction bar 95 is being displayed at the lower left of the visual-field frame 90. Furthermore, a depth-of-field display bar 96, a character 97 indicative of exposure mode, shutter speed 98, aperture value 99 and ISO sensitivity 100 are being displayed below the visual-field frame 90.

Figure 10:
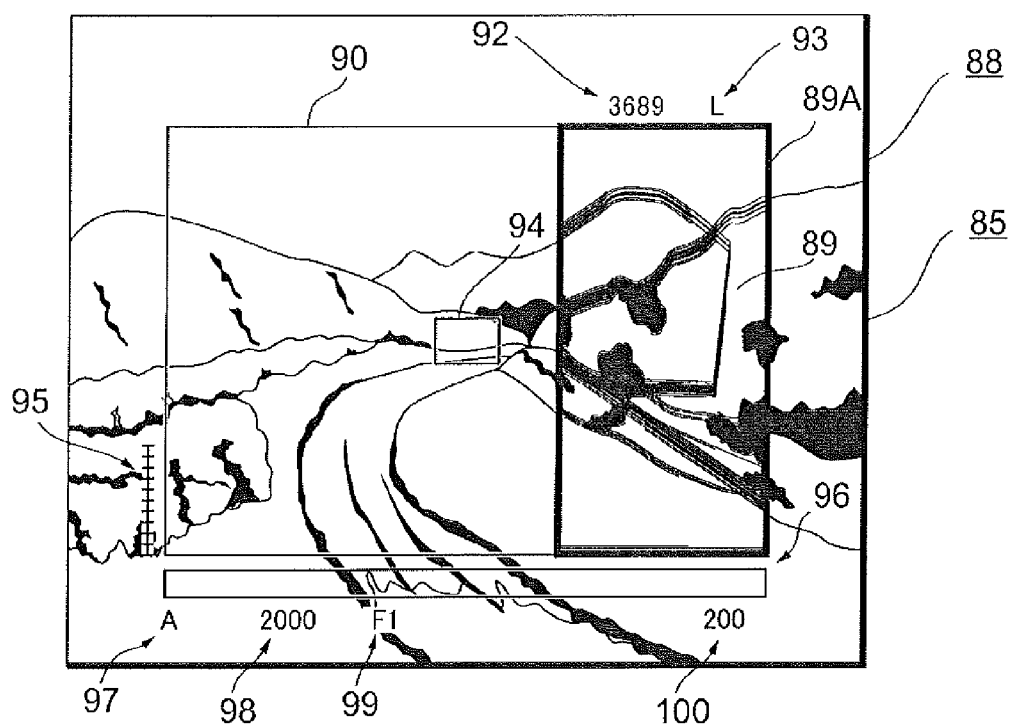
FIG. 10 illustrates an image obtained by superimposing an optical image of a subject and an image displayed in an electronic viewfinder.

FIG. 10 illustrates an image obtained by superimposing the image 88, which is displayed in the electronic viewfinder 65 shown at the bottom of FIG. 9, upon the optical image 85 shown at the top of FIG. 9.

Light rays representing the portion of the image of the subject within the confirmation display area 89 as well as information such as the visual-field frame 90 displayed on the electronic viewfinder 65 reach the eye of the user, who is looking at the eyepiece window 11, owing to the half-mirror 64. The user, therefore, can see an image that is the result of superimposing the information such as the visual-field frame 90, which is being displayed on the electronic viewfinder 65, upon the optical image 85 representing the image of the subject, as shown in FIG. 9.

In particular, according to this embodiment, a portion of the image of the subject captured by the solid-state electronic image sensing device 34 is displayed in the confirmation display area 89, and this portion of the image of the subject is superimposed upon the optical image of the subject seen through the objective window 3. Since the image of the subject captured by the solid-state electronic image sensing device 34 will be blurred in the presence of camera shake, the portion of the image of the subject displayed in the electronic viewfinder 65 will also be blurred (the image within the confirmation display area 89 is blurry also in the example shown in FIG. 10). By viewing the portion of the subject of the image within the confirmation display area 89, the user can tell that camera shake is taking place.

In particular, in the area on the left side of confirmation display area 89 in visual-field frame 90, the optical image of the subject formed via the objective window 3 can be seen as is without the image of the subject captured by the solid-state electronic image sensing device 34 being displayed. Therefore, by comparing the optical image of the subject and the image of the subject that is being displayed in the confirmation display area 89, the user can readily ascertain camera shake if such camera shake is taking place. Further, it may be arranged so that the border 89A of the confirmation display area 89 turns red if camera shake is detected by the camera-shake detection circuit 55 and turns blue if camera shake is not detected. By thus changing the form of display of the border 89A of the confirmation display area 89 in accordance with absence or presence of camera shake, the user can readily whether or not camera shake is taking place.

Figure 11:
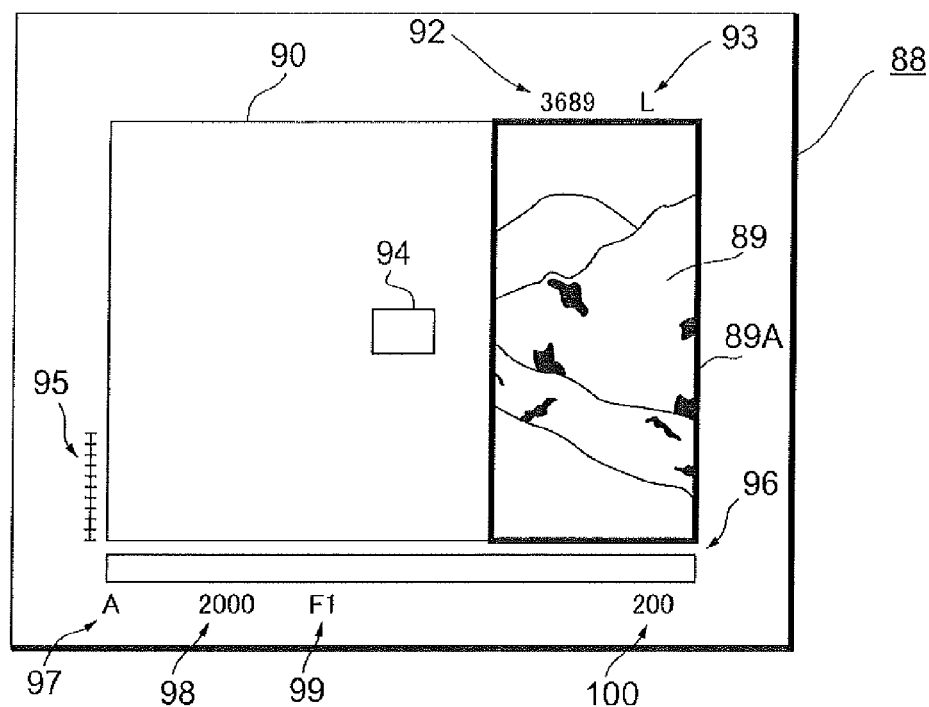
FIG. 11 is an image displayed in an electronic viewfinder.

FIG. 11 is an example of the image 88 displayed in the electronic viewfinder 65. This view corresponds to the view at the top of FIG. 9.

FIG. 11 is an example of the image 88 displayed in the electronic viewfinder 65 when camera shake is not taking place. Since there is no camera shake, the portion of the image of the subject within the confirmation display area 89 will not be blurry.

Figure 12:
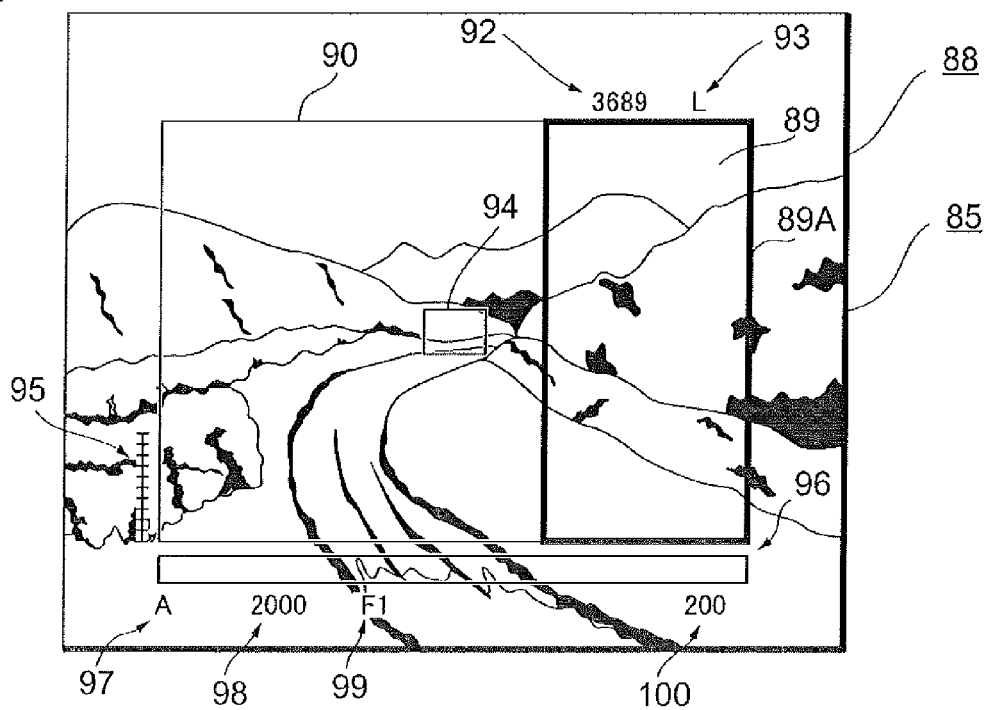
FIG. 12 illustrates an image obtained by superimposing an optical image of a subject and an image displayed in an electronic viewfinder.

FIG. 12 is an example of an image obtained by superimposing the image 88, which is displayed in the electronic viewfinder 65 shown in FIG. 11, upon the optical image of the subject (see the view at the top of FIG. 9) formed via the objective window 3. The example shown in FIG. 12 corresponds to the view shown in FIG. 10.

In the example shown in FIG. 12, unlike the example of FIG. 10, camera shake is not taking place and therefore the image within the confirmation display area 89 is not blurry. By confirming that the image within the confirmation display area 89 is not blurry, the user can tell that the image of the subject captured using the solid-state electronic image sensing device 34 also is not blurry. For example, the border 89A is made to turn blue.

Figure 13:
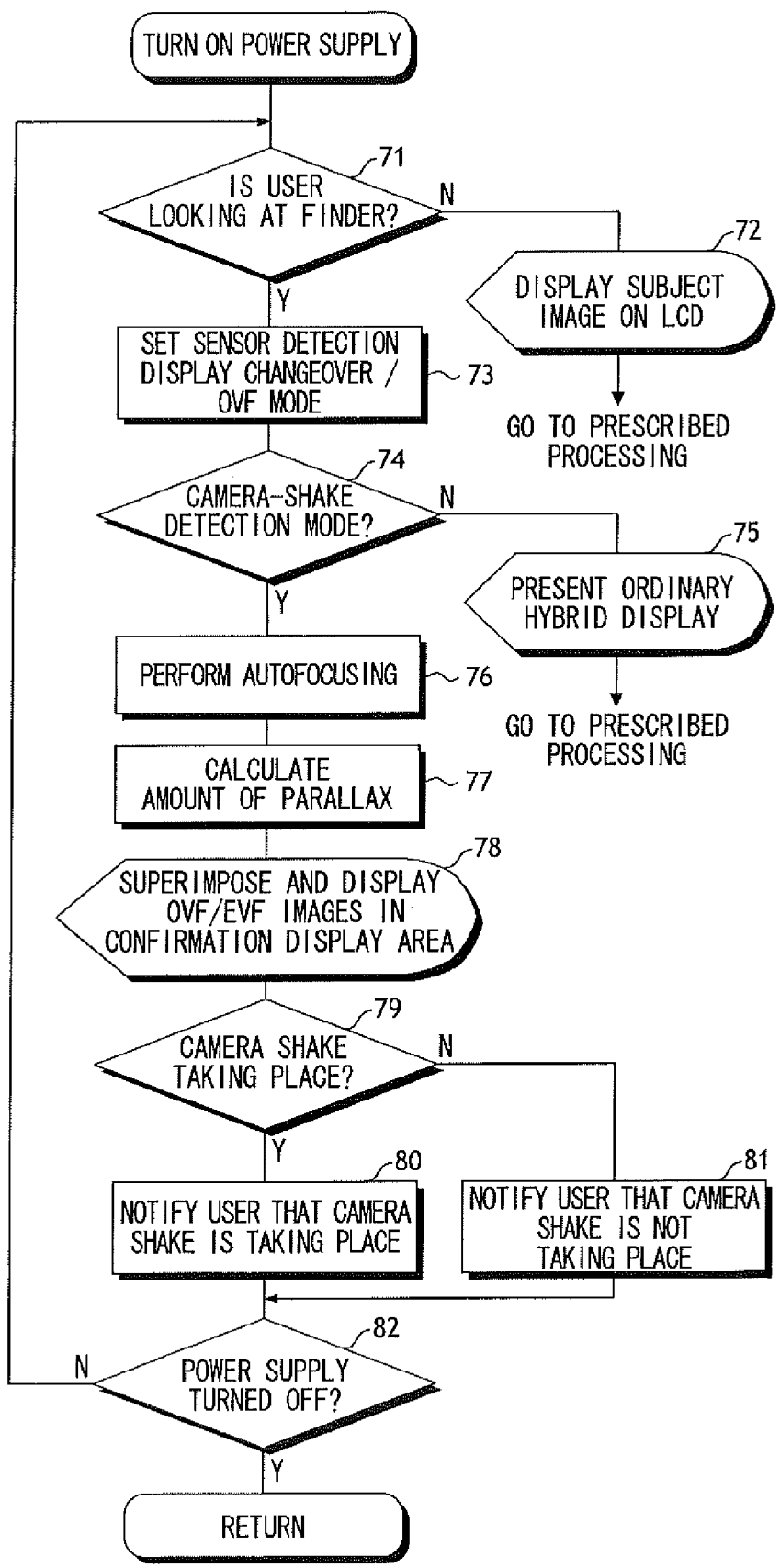
FIGS. 13 and 14 are flowcharts illustrating processing executed by a digital camera.

FIG. 13 is a flowchart illustrating processing executed by the digital camera 1. It is assumed here that the camera has been set to the imaging mode.

When the power supply is turned on by the power lever 7 of the digital camera 1, whether the user is looking at the eyepiece window 11 of the optical viewfinder 60 is checked by the eye sensor 67, as described above (step 71). If the eye of the user cannot be sensed by the eye sensor 67 ("NO" at step 71), it is judged that the user is not looking at the eyepiece window 11 of the optical viewfinder 60. Consequently, the image of the subject obtained by imaging is displayed on the liquid crystal display device 12 (step 72).

If the eye of the user is sensed by the eye sensor 67 and it is judged that the user is looking at the eyepiece window 11 of the optical viewfinder 60 ("YES" at step 71), the camera is set to a sensor detection display changeover/OVF mode (step 73). The OVF shutter 62 opens and the user looking at the eyepiece window 11 can see the optical image of the subject.

Next, it is determined whether the camera-shake detection mode has been set by a mode setting switch (not shown) included among the operating switches 23 (step 74). If the camera-shake detection mode has not been set ("NO" at step 74), a portion of the image of the subject is not displayed in the electronic viewfinder 65. Prescribed information such as the visual-field frame is displayed in the electronic viewfinder 65 and this information is displayed in a form superimposed upon the optical image of the subject formed via the objective window 3 (the usual hybrid display is presented)(step 75).

If the camera-shake detection mode has been set ("YES" at step 74), AF processing is executed using the AF detection circuit 46 (step 76). In AF processing, the distance to a principal subject is calculated. The parallax angle is calculated, as described above, using the calculated distance to the principal subject and the distance from the optical axis of the lens barrel 2 to the optical axis of the objective window 3, and an amount of parallax, which is an amount of offset for shifting the portion of the image of the subject displayed in the electronic viewfinder 65, is calculated (step 77).

The portion of the image of the subject obtained by imaging is displayed in the electronic viewfinder 65 upon being shifted by the calculated amount of parallax. The image displayed in the electronic viewfinder 65 and the image of the subject formed optically via the objective window 3 are superimposed in the manner shown in FIG. 10 or FIG. 12 (step 78).

If camera shake occurs ("YES" at step 79), as shown in FIG. 10, then camera shake is detected by the camera-shake detection circuit 55 and the border 89A of the confirmation display area 89 turns red. As a result, the user is notified of the fact that the digital camera 1 is undergoing camera shake (step 80). If camera shake is not detected ("NO" at step 79), then the border 89A of the confirmation display area 89 turns blue. As a result, the user is notified of the fact that the digital camera 1 is not undergoing camera shake (step 81).

The processing from step 71 onward is repeated unless the power supply is turned off or unless the mode is changed to one other than the imaging mode (step 82).

In the foregoing embodiment, amount of parallax is calculated and a parallax adjustment applied if the camera-shake mode has been set. However, a parallax adjustment need not be applied in a case where the distance to the principal subject is equal to or greater than a predetermined distance, as mentioned above. It goes without saying that it may be arranged so that a parallax adjustment is performed even if there is a long distance to the principal subject.

Figure 14:
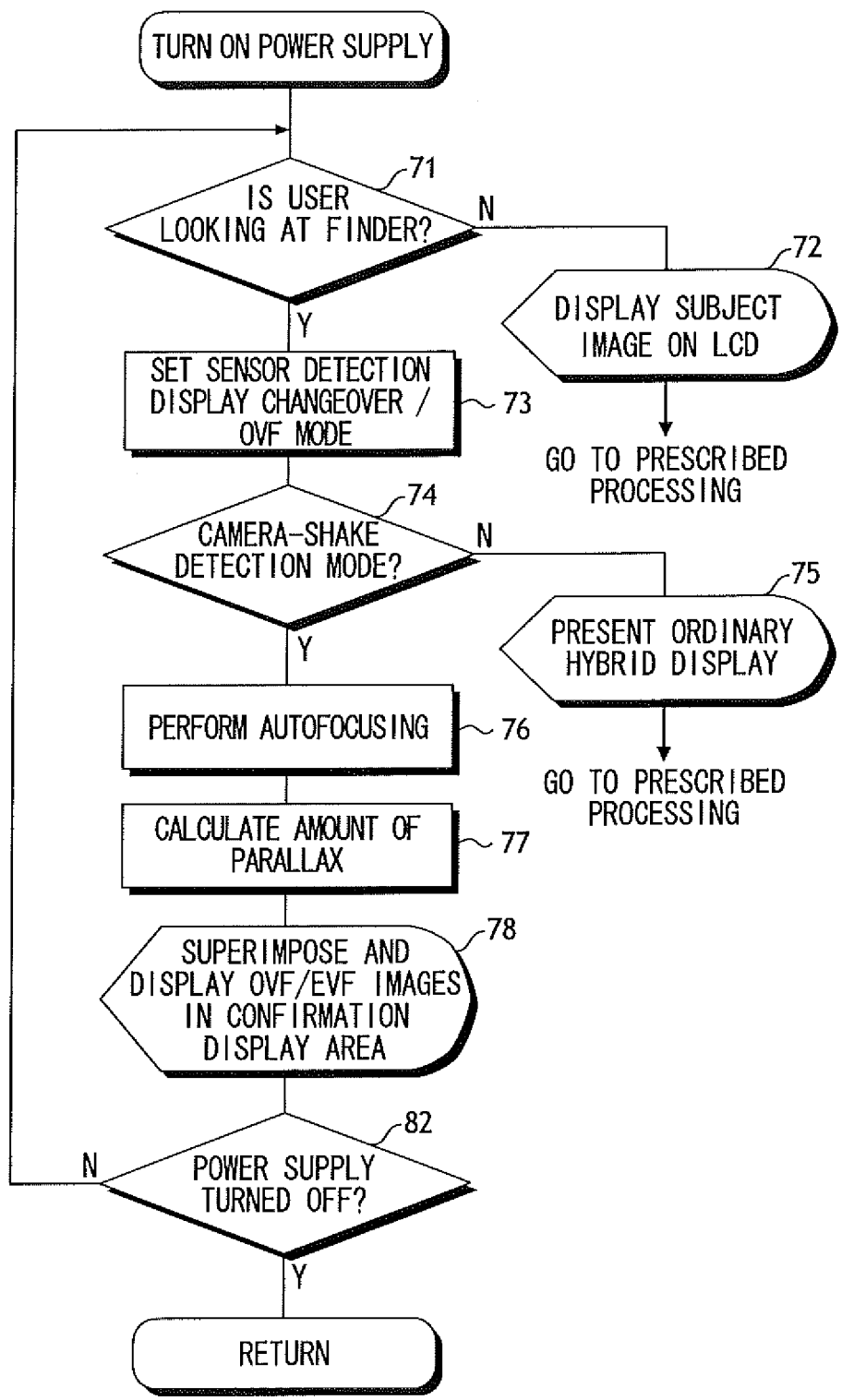

FIG. 14, which illustrates a modification, is a flowchart showing processing executed by the digital camera 1. Processing steps shown in FIG. 14 identical with those shown in FIG. 13 are designated by like step numbers and need not be described again.

In the embodiment shown in FIG. 13, whether camera shake is taking place or not is checked by the camera-shake detection circuit 55 and the user is notified of the absence or presence of camera shake. In the embodiment shown in FIG. 14, however, the user is not notified of the absence or presence of camera shake. Here the user judges whether camera shake is taking place or not by observing the state of the image within the confirmation display area 89.

Figure 15:
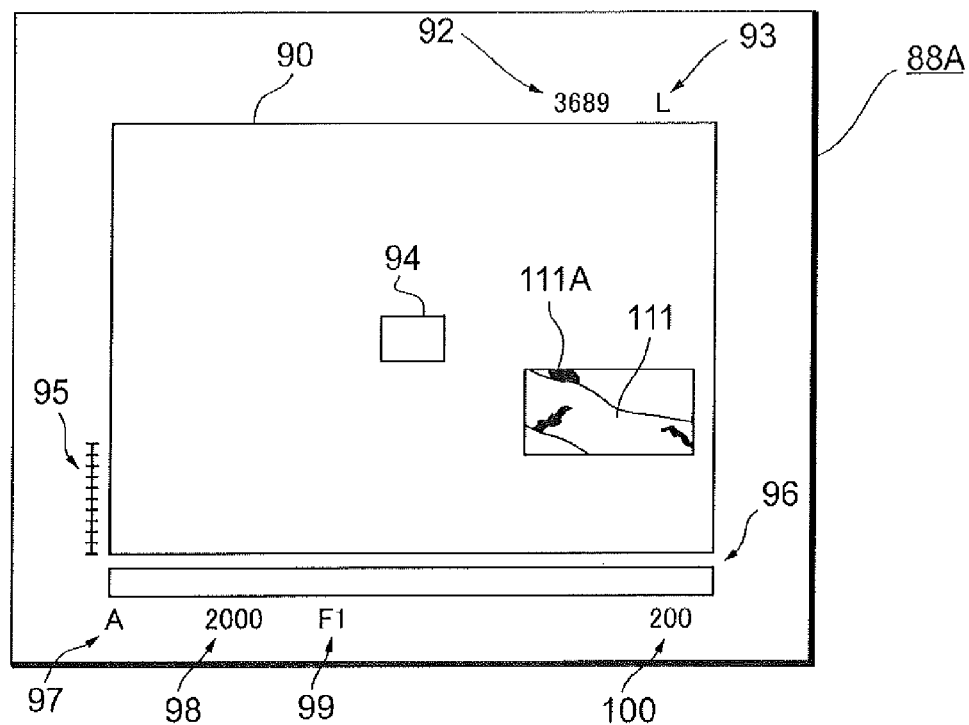
FIG. 15 illustrates an image displayed in an electronic viewfinder.
Figure 16:
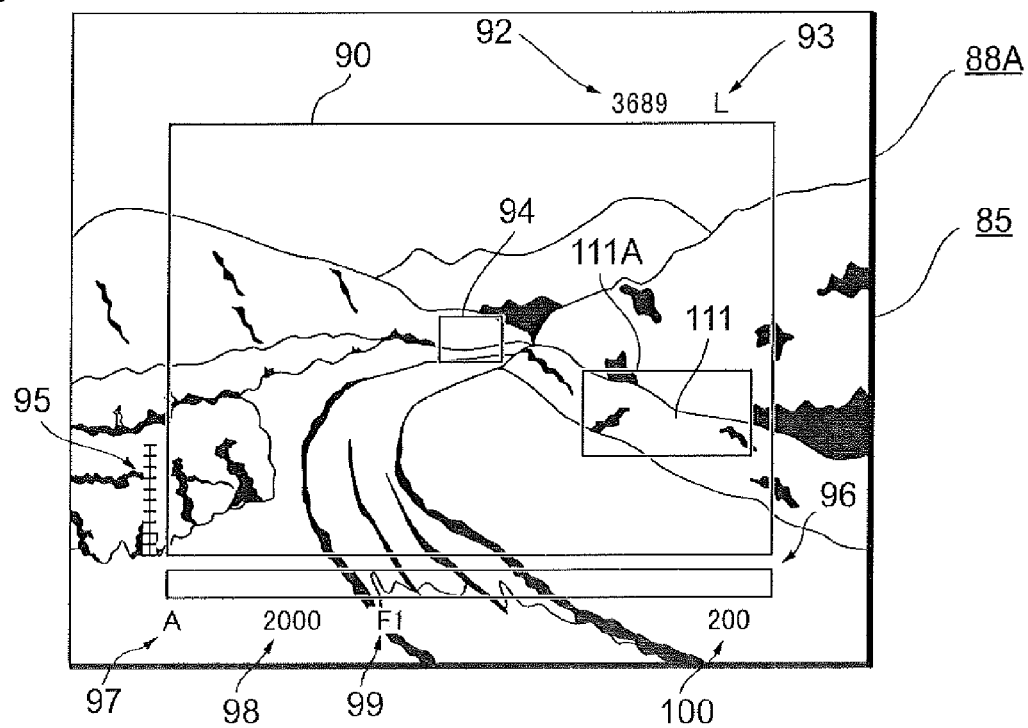
FIG. 16 illustrates an image obtained by superimposing an optical image of a subject and an image displayed in an electronic viewfinder.

FIGS. 15 and 16 illustrate another modification.

FIG. 15, which is an example of an image 88A displayed in the electronic viewfinder 65, corresponds to the diagram at the top of FIG. 9 and to FIG. 11. Items shown in the diagram at the top of FIG. 9, etc., identical with those shown in FIG. 15 are designated by like reference characters and need not be described again.

In FIG. 15, a comparatively small confirmation display area 111 is formed at the lower right of the visual-field frame 90, and the confirmation display area 111 is formed to have a border 111A. Whereas the confirmation display area 89 shown at the top of FIG. 9 occupies approximately one-third of the visual-field frame 90, the confirmation display area 111 being displayed in the image 88A shown in FIG. 15 is comparatively small. A portion of the image of the subject captured by the solid-state electronic image sensing device 34 is thus displayed in the comparatively small confirmation display area 111.

FIG. 16 corresponds to FIG. 10 or 12 and illustrates an image obtained by superimposing the image 88A, which is displayed in the electronic viewfinder 65 shown in FIG. 15, upon the optical image 85 of the subject formed via the objective window 3.

In the confirmation display area 111, the portion of the image of the subject displayed in the electronic viewfinder 65 and captured by the solid-state electronic image sensing device 34 is superimposed upon the optical image 85 of the subject. If the image within the confirmation display area 111 is blurry, the user can tell that camera shake is taking place.

The form of display of the border 111A of the confirmation display area 111 can be changed in accordance with absence or presence of camera shake in a manner similar to that set forth above.

Figure 17:
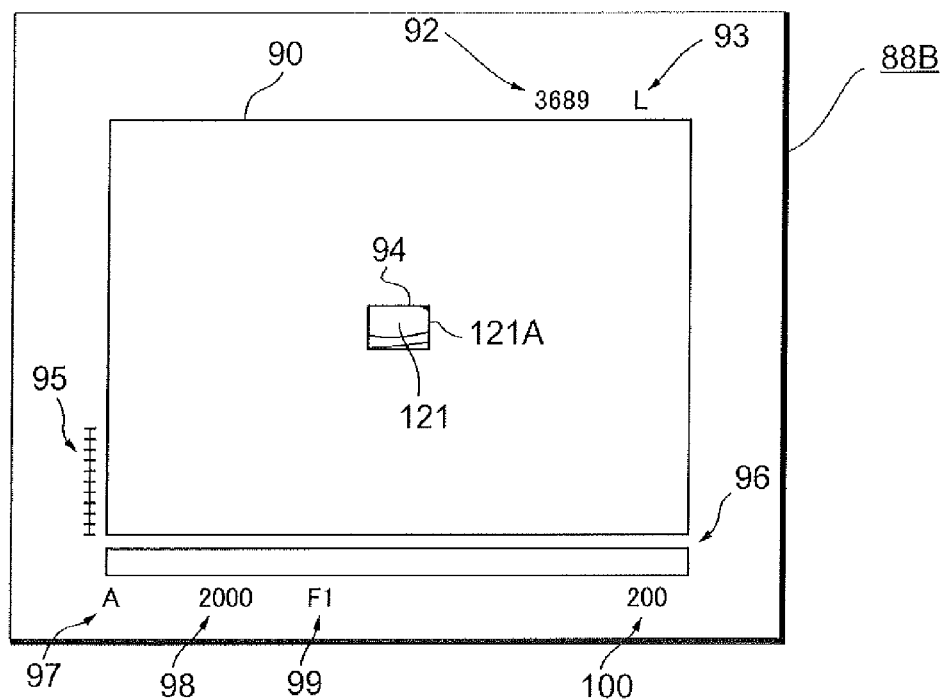
FIG. 17 illustrates an image displayed in an electronic viewfinder.
Figure 18:
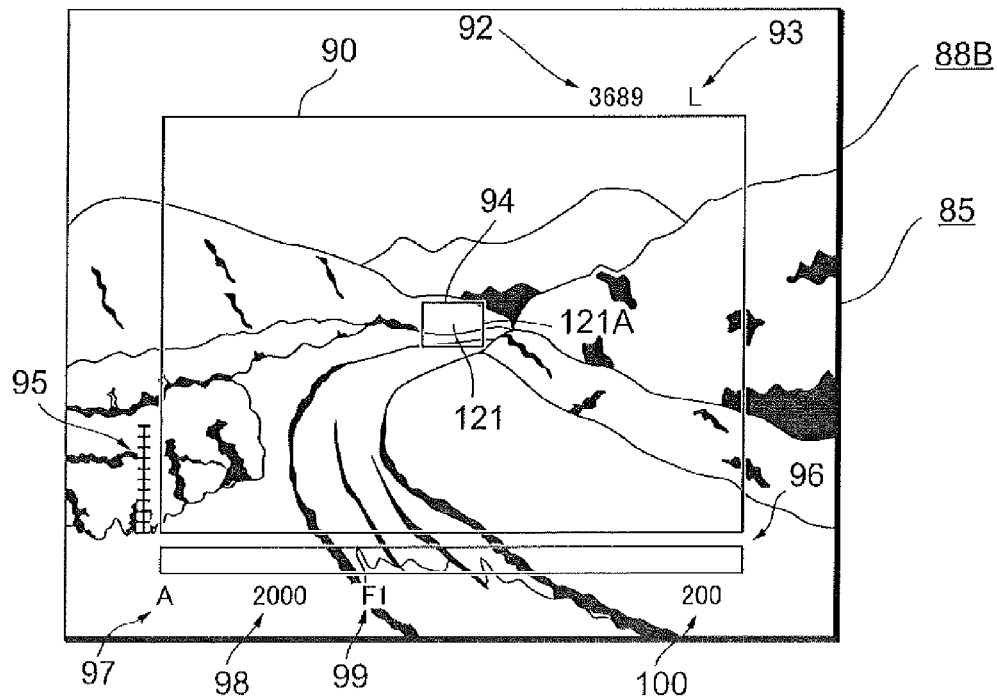
FIG. 18 illustrates an image obtained by superimposing an optical image of a subject and an image displayed in an electronic viewfinder.

FIGS. 17 and 18 illustrate yet another modification.

FIG. 17, which is an example of an image 88B displayed in the electronic viewfinder 65, corresponds to the diagram at the top of FIG. 9 and to FIGS. 11 and 15. Items shown in the diagram at the top of FIG. 9, etc., identical with those shown in FIG. 17 are designated by like reference characters and need not be described again.

In FIG. 17, the region within the AF target frame 94 is defined as a confirmation display area 121. The confirmation display area 121 also is formed to have a border 121A. The border 121A may of course be the same as that of the AF target frame 94. A portion of the image of a subject captured by the solid-state electronic image sensing device 34 is displayed in the confirmation display area 121.

FIG. 18 corresponds to FIG. 10, 12 or 16 and illustrates an image obtained by superimposing the image 88B, which is displayed in the electronic viewfinder 65 shown in FIG. 17, upon the optical image 85 of the subject formed via the objective window 3.

In the confirmation display area 121, which corresponds to the region within the AF target frame 94, the portion of the image of the subject displayed in the electronic viewfinder 65 and captured by the solid-state electronic image sensing device 34 is superimposed upon the optical image 85 of the subject. If the image within the confirmation display area 121 is blurry, the user can tell that camera shake is taking place. Since the user decides the camera angle so as to bring a desired principal subject into correspondence with the AF target frame 94 and also views the image within the AF target frame 94, the user can tell spontaneously whether the image within the confirmation display area 121 is out of focus. Without being aware of it, the user is able to recognize whether camera shake is taking place.

Figure 19:
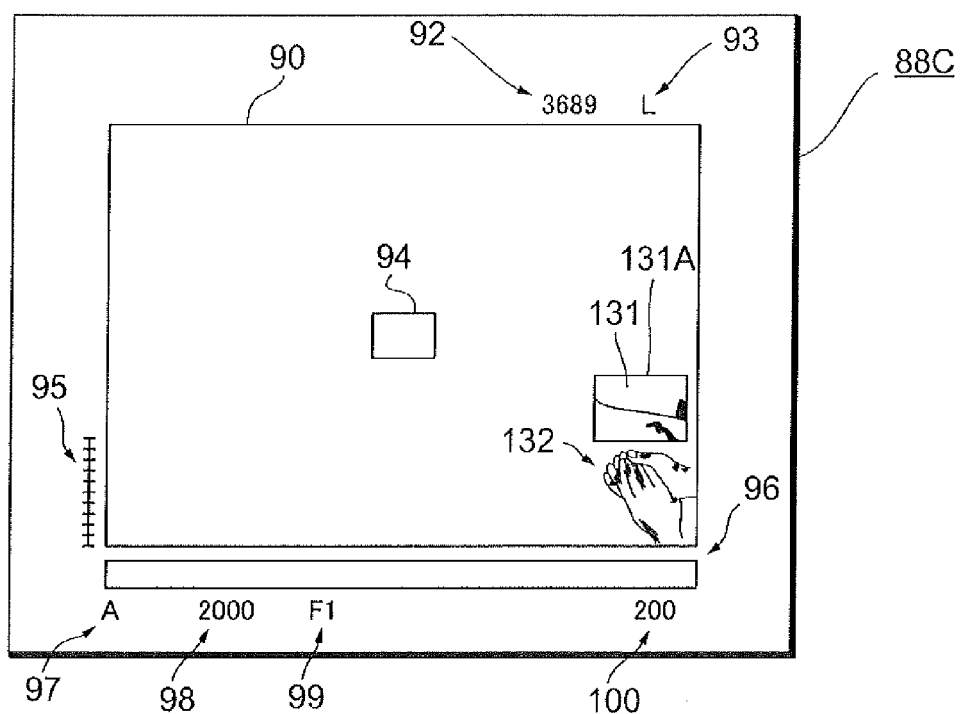
FIG. 19 illustrates an image displayed in an electronic viewfinder.
Figure 20:
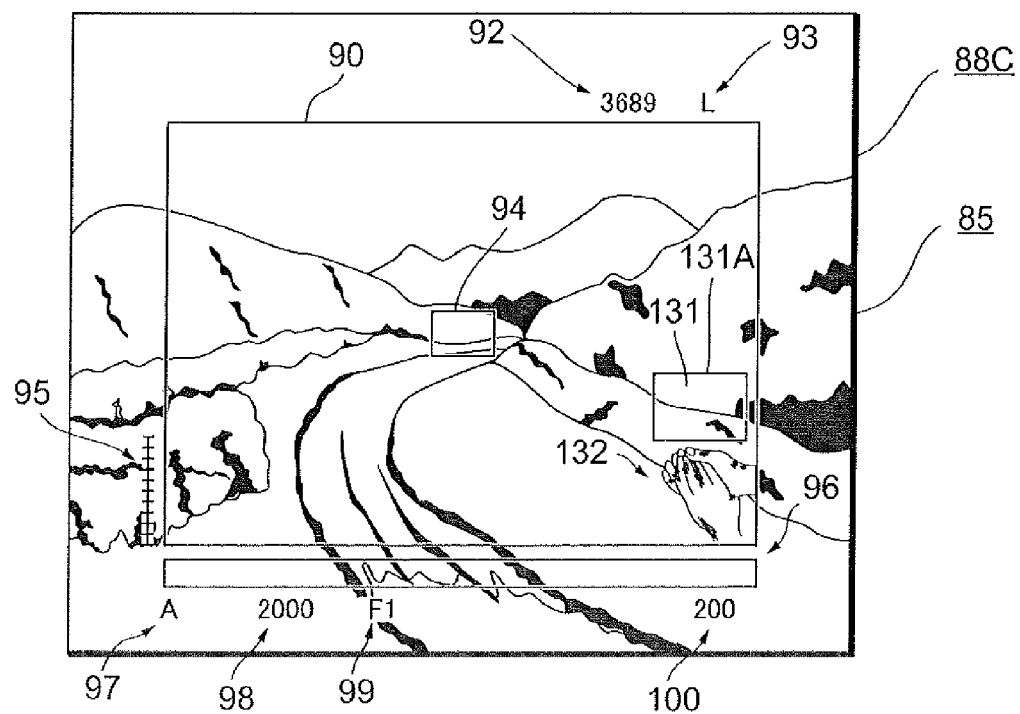
FIG. 20 illustrates an image obtained by superimposing an optical image of a subject and an image displayed in an electronic viewfinder.

FIGS. 19 and 20 illustrate a further modification.

FIG. 19, which is an example of an image 88C displayed in the electronic viewfinder 65, corresponds to the diagram at the top of FIG. 9 and to FIGS. 11, 15 and 17. Items shown in the diagram at the top of FIG. 9, etc., identical with those shown in FIG. 19 are designated by like reference characters and need not be described again.

In FIG. 19, a comparatively small confirmation display area 131 having a border 131A has been defined. Further, in the image 88C shown in FIG. 19, a camera-shake icon 132 indicating the presence of camera shake is being displayed within the visual-field frame 90 at the lower right thereof. Thus, it may be arranged so that, in a case where camera shake has been detected by the camera-shake detection circuit 55, an icon or the like indicating the presence of camera shake is displayed. It goes without saying that a portion of the image of the subject captured by the solid-state electronic image sensing device 34 is displayed within the confirmation display area 131.

FIG. 20 corresponds to FIG. 10, 12, 16 or 18 and illustrates an image obtained by superimposing the image 88C, which is displayed in the electronic viewfinder 65 shown in FIG. 19, upon the optical image 85 of the subject formed via the objective window 3.

In the confirmation display area 131, the portion of the image of the subject displayed in the electronic viewfinder 65 and captured by the solid-state electronic image sensing device 34 is superimposed upon is taking place, the image within the confirmation display area 131 will be out of focus and, as described above, the camera-shake icon 132 will be displayed. The user can ascertain the presence of camera shake by checking the camera-shake icon 132.

In the foregoing embodiments, an audio tone may be used to notify the user if camera shake is taking place. In such case the digital camera 1 would be provided with a speaker.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
   an optical viewfinder formed on the front of the camera and having an objective window facing a subject and an eyepiece window for looking at the subject seen through the objective window;
   a solid-state electronic image sensing device for imaging the subject and outputting image data representing the image of the subject;
   a display unit for displaying a portion of the image of the subject, which is represented by the image data that has been output from said solid-state electronic image sensing device, on a display screen;
   a deflecting unit for introducing the portion of the image of the subject, which is being displayed on the display screen of said display unit, to the eyepiece window so as to be superimposed upon the subject seen through the eyepiece window;
   a camera-shake detection device for detecting shaking of the camera; and
   a camera-shake notification device for notifying of camera shake in response to the fact that camera shake has been detected by said camera-shake detection device, wherein
   said display unit displays a portion of the subject image on the display screen in such a manner that a principal subject seen through said optical viewfinder and a principal subject image among subject images captured in said solid-state electronic image sensing device will coincide, and
   wherein said camera-shake notification device notifies of camera shake by displaying, on the display screen of said display unit, a character string to the effect that camera shake is taking place or an image representing the fact that camera shake is taking place, or by changing the form of a border, which encloses a portion of the image of the subject, in accordance with whether or not camera shake is taking place.

2. The camera according to claim 1, wherein if the distance from the camera to a principal subject is equal to or greater than a predetermined distance, said display unit displays a portion of the subject image on the display screen upon applying a parallax correction in such a manner that a principal subject seen through said optical viewfinder and a principal subject image among subject images captured in said solid-state electronic image sensing device will coincide.

3. The camera according to claim 1, further comprising a recording control device for recording image data, which has been output from said solid-state electronic image sensing device, on a recording medium.

4. A method of controlling operation of a camera which includes an optical viewfinder formed on the front of the camera and having an objective window facing a subject and an eyepiece window for looking at the subject seen through the objective window, said method comprising steps of:
- a solid-state electronic image sensing device imaging the subject and outputting image data representing the image of the subject;
- a display unit displaying a portion of the image of the subject, which is represented by the image data that has been output from the solid-state electronic image sensing device, on a display screen;
- a deflecting unit introducing the portion of the image of the subject, which is being displayed on the display screen of the display unit, to the eyepiece window so as to be superimposed upon the subject seen through the eyepiece window;
- a camera-shake detection device detecting shaking of the camera; and
- a camera-shake notification device notifying of camera shake in response to the fact that camera shake has been detected by said camera-shake detection device, wherein said display unit displays a portion of the subject image on the display screen in such a manner that a principal subject seen through said optical viewfinder and a principal subject image among subject images captured in said solid-state electronic image sensing device will coincide, and said camera-shake notification device notifies of camera shake by displaying, on the display screen of said display unit, a character string to the effect that camera shake is taking place or an image representing the fact that camera shake is taking place, or by changing the form of a border, which encloses a portion of the image of the subject, in accordance with whether or not camera shake is taking place.

* * * * *